(12) United States Patent
Kotsuki

(10) Patent No.: US 6,700,959 B2
(45) Date of Patent: Mar. 2, 2004

(54) FACSIMILE MACHINE

(75) Inventor: Kunio Kotsuki, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/327,128

(22) Filed: Dec. 24, 2002

(65) Prior Publication Data

US 2003/0128824 A1 Jul. 10, 2003

(30) Foreign Application Priority Data

Dec. 27, 2001 (JP) ........................... 2001-396412

(51) Int. Cl.[7] ............................................. H04M 11/00
(52) U.S. Cl. ........................ 379/100.01; 379/90.01; 379/93.17
(58) Field of Search ..................... 379/100.01, 100.07, 379/100.09, 100.12, 100.17, 90.01, 93.05, 93.06, 93.07; 358/1.15, 403, 448, 468, 402

(56) References Cited

U.S. PATENT DOCUMENTS

| | | | |
|---|---|---|---|
| 6,041,324 A | * | 3/2000 | Earl et al. ........................ 709/7 |
| 6,230,189 B1 | | 5/2001 | Sato et al. |
| 2003/0054841 A1 | * | 3/2003 | Griswold et al. ........... 455/460 |

FOREIGN PATENT DOCUMENTS

| | | |
|---|---|---|
| EP | 0 939 541 | 9/1999 |
| EP | 1 073 254 | 1/2001 |
| JP | 11-215338 | 8/1999 |
| JP | 2002-125088 | 4/2002 |
| WO | 00/40000 | 7/2000 |

OTHER PUBLICATIONS

Patent Abstracts of Japan, vol. 2000, No. 21, Aug. 3, 2001 & JP 2001–101113 A (Brother Ind. Ltd), Apr. 13, 2001, Abstract.

* cited by examiner

*Primary Examiner*—Melur Ramakrishnaiah
(74) *Attorney, Agent, or Firm*—Wenderoth, Lind & Ponack, L.L.P.

(57) ABSTRACT

A facsimile machine is capable of displaying a desired home page by one-touch operation. When button information obtained while the facsimile machine is in a standby state is a favorite-link button, a URL address corresponding to the button specifying information is retrieved from a memory unit, a HTTP request protocol is generated based on the URL address, and the generated HTTP request is transmitted to a server. After data in HTML is obtained from the server, the received data in HTML is displayed by the browser. Thus, the facsimile machine is capable of displaying the desired home page by one-touch operation.

13 Claims, 5 Drawing Sheets

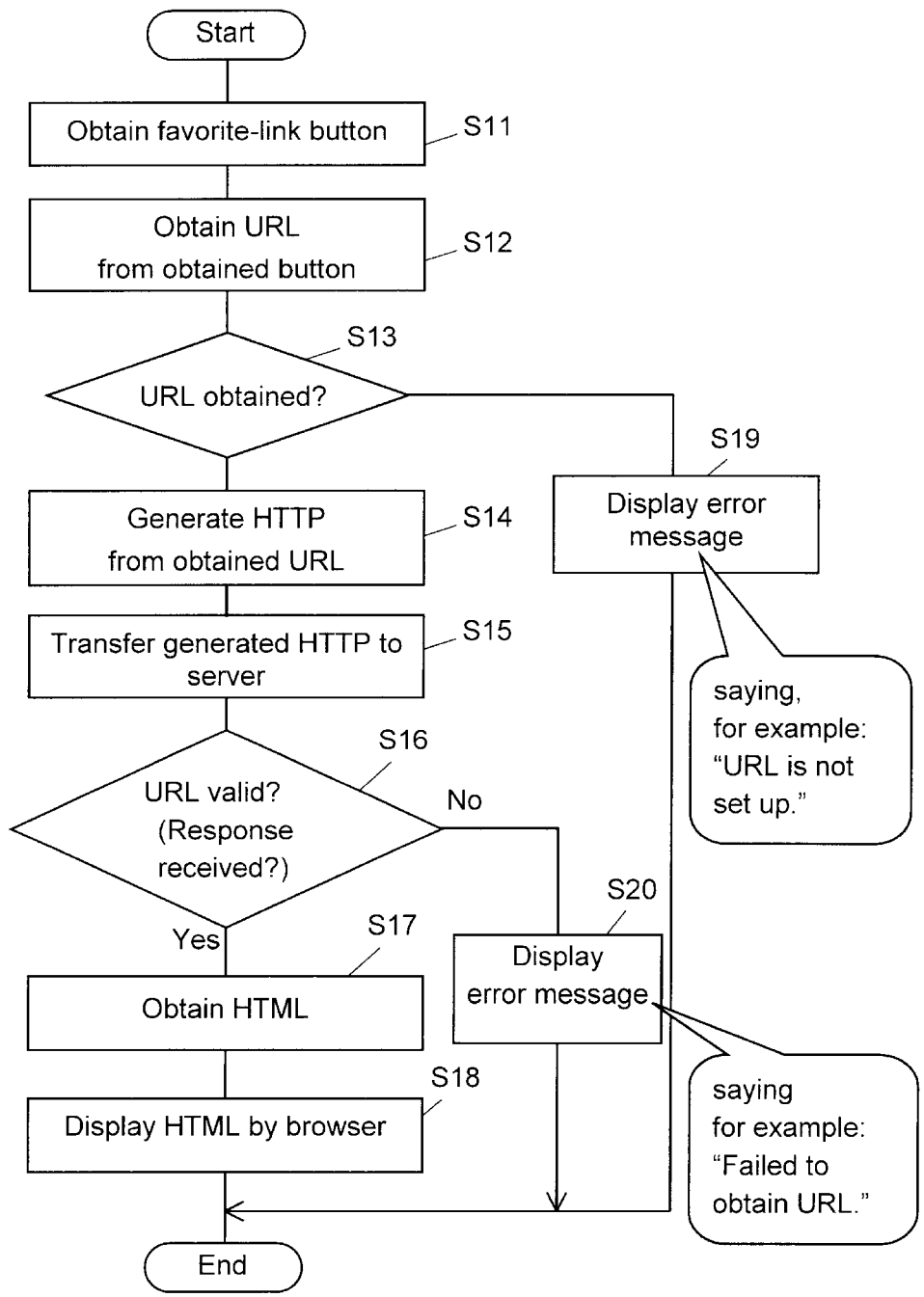

FACSIMILE MACHINE

TECHNICAL FIELD

The present invention relates to a facsimile machine capable of accessing a mail server and displaying a home page.

BACKGROUND OF THE INVENTION

In a conventional facsimile machine capable of displaying a home page, the following operations are carried out for obtaining a URL address and accessing a server: (1) having a menu displayed by using browser software; (2) thereby obtaining the URL address registered in a bookmark or the like; and (3) then accessing the server based on the obtained URL address.

In such a conventional facsimile machine, however, the operation to display a home page was performed by starting the browser and it required a number of steps to follow. Thus, there has been a problem with the prior art in that it requires complicated operations to be performed.

An invention having an electronic mail address registered at a one-touch dial key to thereby simplify transmission of an electronic mail is disclosed in Japanese Patent Laid-open Publication No. H11-215338. Another invention related to the above, which had not been laid open when the present invention was applied for a patent in Japan, is disclosed in Patent Laid-open Publication No. 2002-125088.

SUMMARY OF THE INVENTION

In view of the above mentioned problem with the conventional art, it is an object of the present invention to provide a facsimile machine capable of displaying a desired home page by one-touch operation.

The facsimile machine of the present invention, while being in its standby state, obtains button specifying information, retrieves from memory means an address corresponding to the button specifying information, generates a protocol based on the address, and sends the generated protocol to a server. Upon receipt of data in HTML format from the server, it displays the obtained data by the browser. Thus, the facsimile machine can display a desired home page by one-touch operation.

Further, when the obtained button specifying information is a mail address or a telephone directory, the facsimile machine of the present invention generates a protocol or a phone number based on the obtained mail address or telephone directory and sends the generated protocol or phone number to the mail server or the telephone, and thereby, by only pressing a button while the facsimile machine is in its standby state, the facsimile machine can obtain a desired mail address or phone number in an automatic manner and create a display on the basis of the mail address or phone number. Thus, a desired display instruction can be made by one-touch operation.

BRIEF DESCRIPTION OF THE DRAWINGS

FIG. 7 is a flowchart showing control performed in the central processing unit of the facsimile machine according to the first preferred embodiment of the invention in performing its home page displaying operation.

DETAILED DESCRIPTION

Referring to the accompanying drawings, a preferred embodiment of the present invention will be described below.

First Preferred Embodiment

Figure 1:
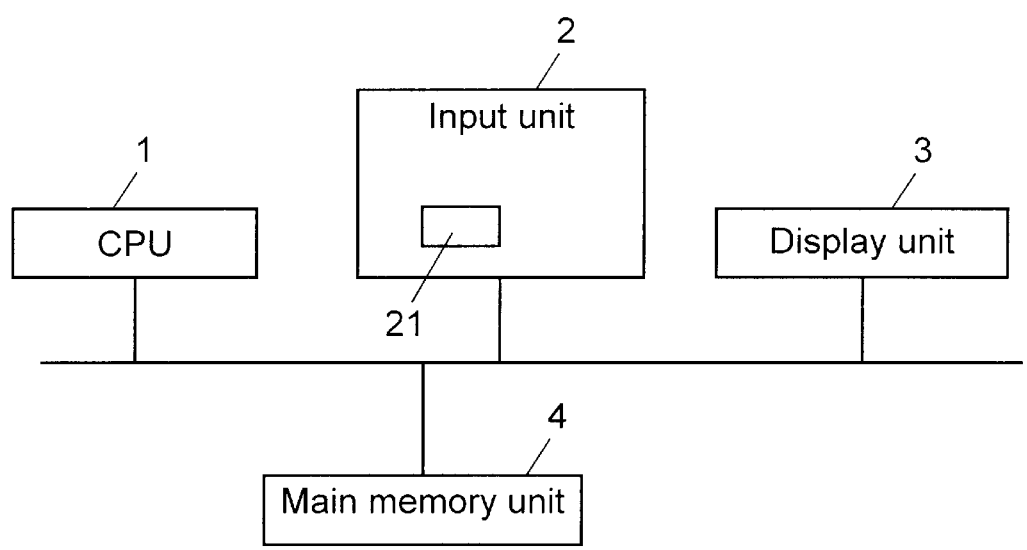
FIG. 1 is a block diagram showing a facsimile machine in a first preferred embodiment of the present invention.
Figure 2:
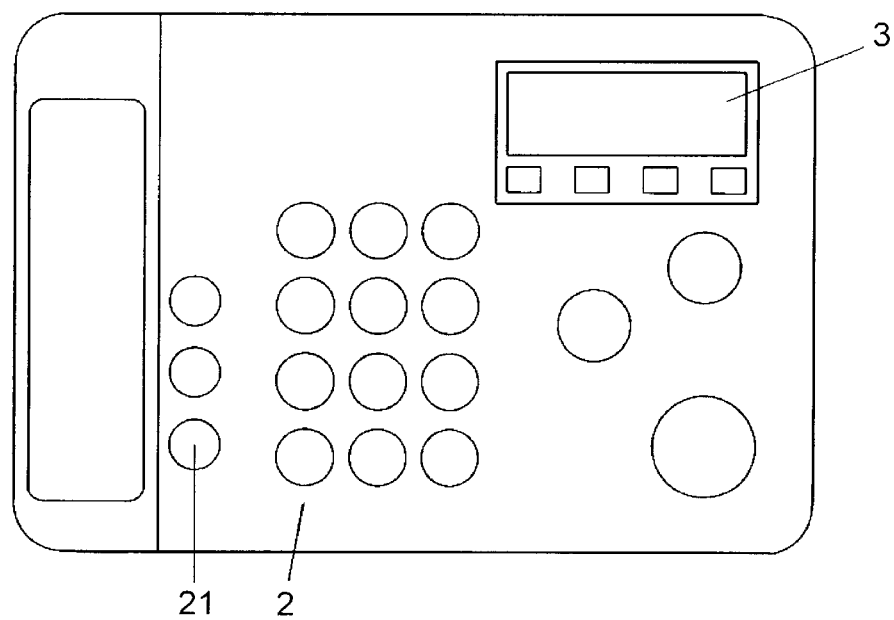
FIG. 2 is a plan view showing an outward appearance of the facsimile machine in the first preferred embodiment of the present invention.
Figure 3:
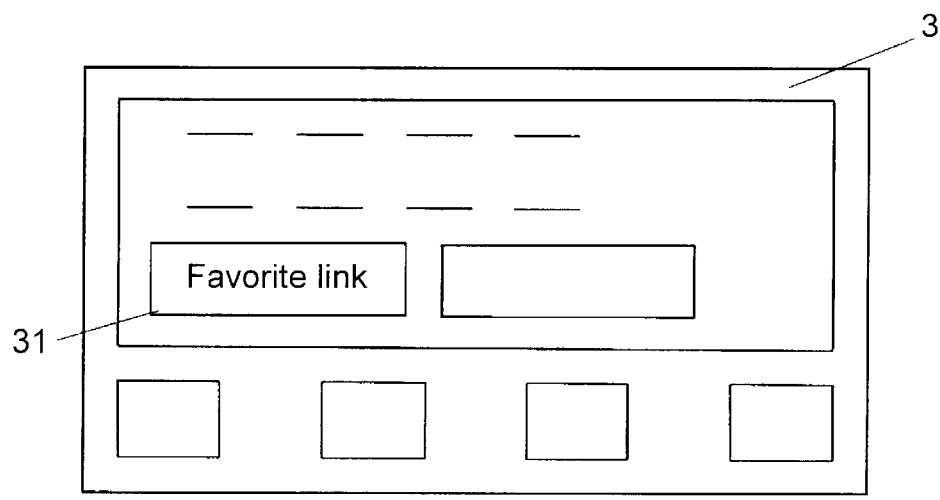
FIG. 3 is a plan view showing a display unit of the facsimile machine in the first preferred embodiment of the present invention.

FIG. 1 is a block diagram showing a facsimile machine described in the first preferred embodiment of the present invention, FIG. 2 is a plan view showing an outward appearance of the facsimile machine of FIG. 1, and FIG. 3 is a plan view showing a display unit of the facsimile machine of FIG. 1.

In FIG. 1 to FIG. 3, a central processing unit (CPU) 1 controls the overall operation of the facsimile machine. An input unit 2 having hardware buttons or keys provided thereon is for a user to enter a number, a mail address, a URL, and the like for a destination. A display unit 3 displays characters and images. An main memory 4 stores program and data.

The input unit 2 has a plurality of favorite-link buttons 21. Further, favorite-link buttons 31 on the display unit 3 are software buttons displayed on the screen.

Operation of the facsimile machine structured as detailed above will be briefly described.

First, a URL address set-up operation will be described. In order that a desired URL address be obtained by pressing favorite-link button 21 shown in FIG. 2 while the facsimile machine is in a standby state, it is required to have the desired URL address in association with favorite-link button 21 stored in the main memory 4.

The user places the facsimile machine in a URL set-up mode by menu selection means (not shown). In the URL set-up mode, the display unit 3 displays prompts to enter the kind of button (in this case, a number to specify one button out of a plurality of favorite-link buttons 21: button specifying information) and the URL address. If the user enters the button specifying information and the URL address in accordance with the instructions, the button specifying information and the URL address, in association with each other, are stored in the main memory 4.

After such a piece of button specifying information and a URL address associated with each other have been stored in memory in the manner described above, pushing the favorite-link button 21, while in a standby state of the facsimile machine, allows the corresponding URL address (for example, the URL address of Yahoo) to be read out from the main memory 4.

A home page displaying operation will now be explained. When the user presses the favorite-link button 21 shown in FIG. 2 while the facsimile machine is in a standby state, the URL address associated with the favorite-link button 21 is read out from the main memory 4 and a HTTP request is generated from the URL address. The generated HTTP request is transmitted to a server having the related URL address through a communication line. The server, in response thereto, sends back data in HTML to the facsimile machine. The facsimile machine upon receipt of the HTML displays a home page based on the HTML by using its browser.

The above example was explained using a hardware button as the favorite-link button 21. However, it is also possible to click on the favorite-link button 31 displayed on the screen of the display unit 3 (a software button) with a pointing device as shown in FIG. 3 to thereby obtain the related URL address.

Figure 4:
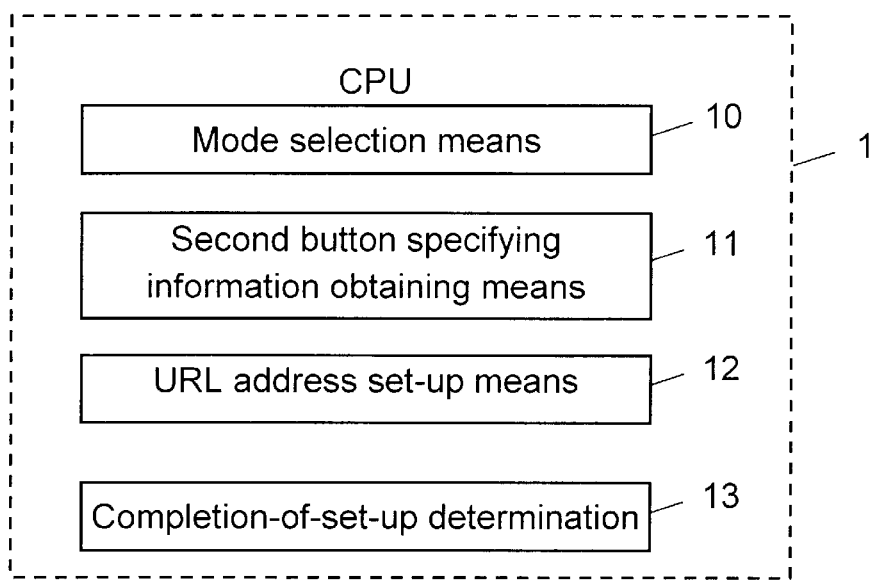
FIG. 4 is a block diagram of function realization means for realizing URL set-up operation in the facsimile machine according to the first preferred embodiment of the present invention.

FIG. 4 is a block diagram of function performing means for executing the URL address set-up operation (i.e., constituent elements of the CPU 1) in the facsimile machine shown in FIG. 1 to FIG. 3.

As shown in FIG. 4, CPU 1 has mode selection means 10 for selecting the URL set-up mode, second button specifying information obtaining means 11 for obtaining button specifying information after selection of the URL set-up mode, URL address set-up means 12 for obtaining and storing in memory a URL address after receipt of the button specifying information, and completion-of-set-up determination means 13 for determining whether the URL set-up operation is completed.

Figure 6:
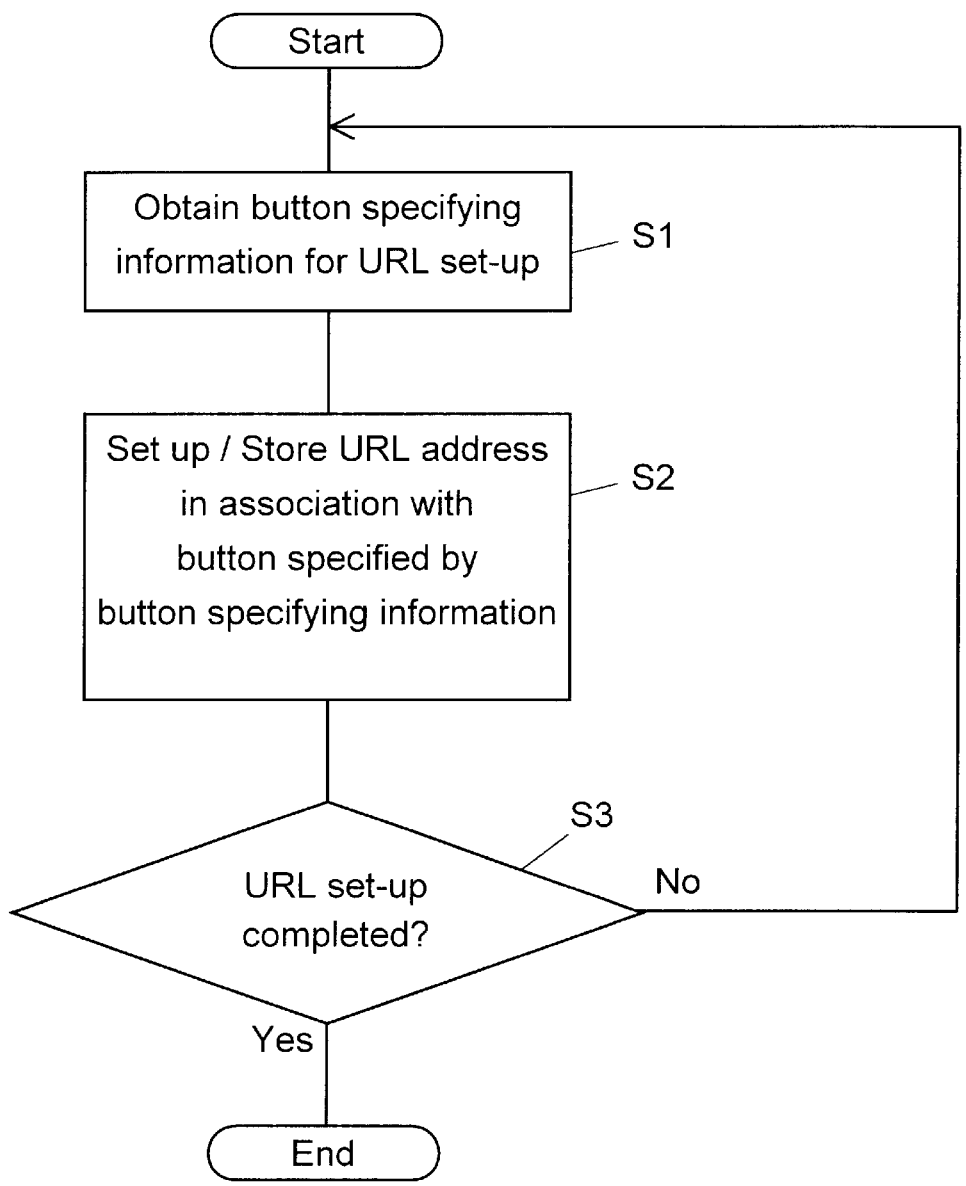
FIG. 6 is a flowchart showing control performed in a central processing unit of the facsimile machine according to the first preferred embodiment of the invention when performing its URL set-up operation.

The operation of the central processing unit (CPU) 1 shown in FIG. 4 will be described with reference to FIG. 6. FIG. 6 is a flowchart showing steps of control performed in the CPU 1 shown in FIG. 4.

First, a menu selection means (not shown) displays a menu. If the user, while looking at the menu, selects the URL set-up mode, the apparatus is placed into the URL setup mode.

At step S1 in this URL set-up mode, a prompt is displayed which prompts the user to enter button specifying information and a URL address and, upon the entry, the entered button specifying information is obtained. The button specifying information is a piece of data specifying one button out of the favorite-link buttons 21, or, in other words, it is a signal indicating that a particular button is pressed. At step S2, the user following the displayed instruction enters a desired URL address and then presses one button out of favorite-link buttons 21 for registration. Thereby, the button specifying information for specifying the button and the entered URL address are stored in association with each other in the main memory 4. At step S3, it is determined whether the URL set-up operation is completed. When it is determined that the operation has been completed, the URL set-up operation is ended; when it is determined the operation has not been completed, the operation returns to step S1 and the URL set-up operation is started again.

The process performed at step S1 in FIG. 6 corresponds to the second button specifying information obtaining means 11 shown in FIG. 4 and the process performed at step S2 corresponds to the URL address set-up means 12 shown in FIG. 4. Further, the process performed at step S3 corresponds to the completion determination means 13 shown in FIG. 4.

Thus, in the URL set-up mode, the user is enabled to easily establish a URL address corresponding to the button specifying information selected by the user and also enabled to update a URL address with ease.

Figure 5:
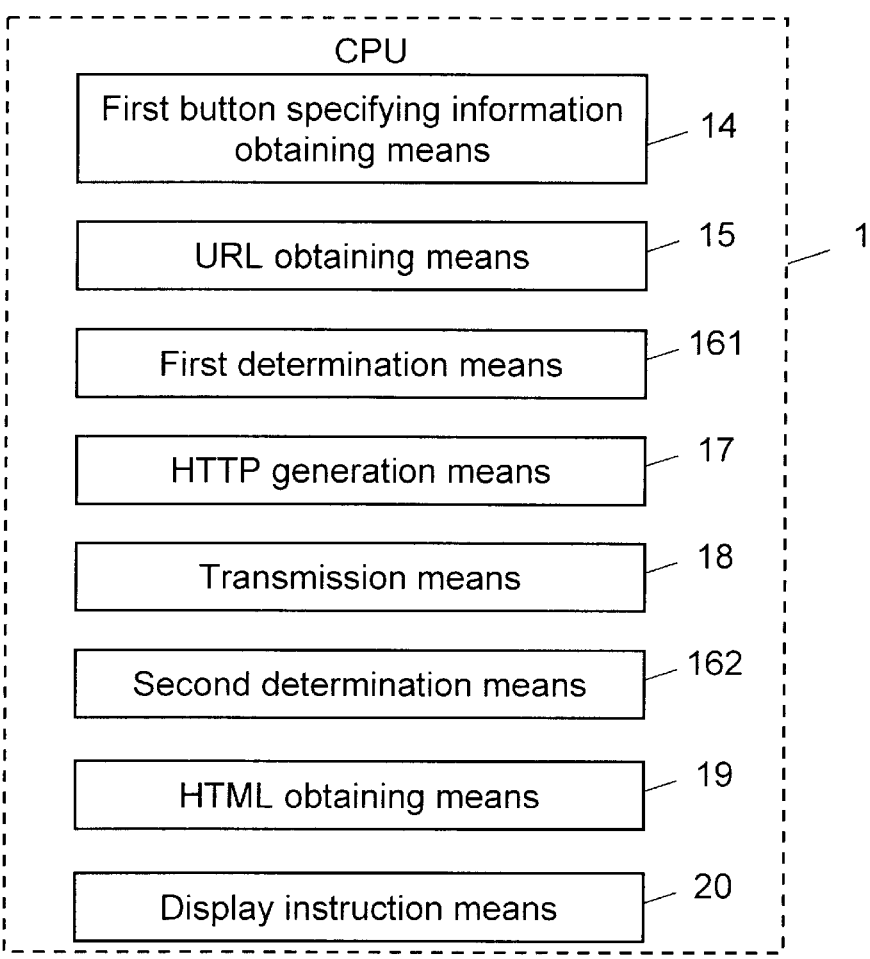
FIG. 5 is a block diagram of function realization means for realizing home page displaying operation in the facsimile machine according to the first preferred embodiment of the present invention.

FIG. 5 is a block diagram showing function performing means for performing home page displaying operation (i.e., constituent elements of the CPU 1) in the facsimile machine shown in FIG. 1 to FIG. 3. The CPU 1 shown in FIG. 5 has first button specifying information obtaining means 14 for obtaining button specifying information entered while the facsimile machine is in a standby state, URL obtaining means 15 for obtaining, when the obtained button specifying information is a favorite-link button, a URL address corresponding to the obtained button specifying information, first determination means 161 for making a determination, HTTP generation means 17 for generating HTTP request based on the obtained URL address, transmission means 18 for transmitting the generated HTTP request to a server, HTML obtaining means 19 for obtaining data in HTML from the server, and display instruction means 20 provided with a browser function for displaying the obtained HTML.

FIG. 7 is a flowchart showing steps of control performed in the central processing unit 1 shown in FIG. 5. Control performed by the central processing unit 1 will be described with reference to FIG. 7.

First, when the user enters button specifying information while the facsimile machine is in a standby state, the entered button specifying information is obtained (S11). Further, when the button specifying information obtained at step S11 is a favorite-link button 21, a URL address corresponding to the obtained button specifying information is obtained (S12).

Then, it is determined whether a URL address is obtained (S13). When it is determined that a URL address is obtained, an HTTP request is generated based on the URL address obtained at step S12 (S14). Then the generated HTTP request is transmitted to a server (not shown) (S15).

Then, it is determined whether a response has been made by the server (S16). When the URL address is valid, responsive information is sent over from the server having the address. When it is determined that there is a response from the server, HTML obtaining means 19 receives data in HTML format sent over from the server (S17). Then, the data in HTML format is displayed by using the browser function (S18).

When it is determined at step S13 that the attempt to obtain the URL address has ended in failure, an error message is displayed on the screen of the display unit 3(S19). For example, a message RL is not set up appears. Further, when it is determined that there is no response from the server at step S16, an error message is displayed on the screen the display unit 3 (S20). For example, a message ailed to obtain URL appears.

In FIG. 7, the process at S11 corresponds to the first button specifying information obtaining means 14 in FIG. 5. The process at S1 corresponds to the URL obtaining means 15. The process at S13 corresponds to the first determination means 161. The process at S14 corresponds to the HTTP generation means 17. The process at S15 corresponds to the transmission means 18. The process at S16 corresponds to the second determination means 162. The process at S17 corresponds to the HTML obtaining means 19. Further, processes at S18, S19, and S20 all correspond to display instruction means 20.

Although it was described in the foregoing such that the user, in obtaining button specifying information at step S11, sets up the favorite-link button 21 shown in FIG. 2 and manipulates this favorite-link button 21 to obtain the URL address, the present invention is not limited to taking such a step. The favorite-link button 31 as a software button displayed on the screen of the display unit 3 as shown in FIG. 3 may be set up. In this case, a desired URL address can be obtained by clicking favorite-link button 31.

According to the present preferred embodiment, by having provided therein (a) the first button specifying information obtaining means 14 for obtaining button specifying information entered in a standby state, (b) the URL obtaining means 15 for obtaining the URL address corresponding to the obtained button specifying information in the case where the obtained button specifying information is favorite-link button 21, (c) the HTTP generation means 17 for generating a HTTP request based on the obtained URL address, (d) the transmission means 18 for transmitting the generated HTTP to a server, (e) the HTML obtaining means 19 for obtaining data in HTML from the server and (f) the display instruction means 20 for displaying the obtained data in HTML on a display screen by using a browser, it is made possible to obtain a desired URL address automatically by just pressing the favorite-link button while the facsimile machine is in a standby state and display the home page on the basis of the URL address. Thus, a desired home page can be displayed by one touch operation.

The content or the like of the displayed home page can be printed at any time with the printer of the facsimile machine.

Although above example was explained using one display unit, plural display units can be used and different pictures or letters can be simultaneously displayed.

In the present preferred embodiment, the case where the favorite-link buttons 21 or 31 are associated with URL addresses has been shown. However, it is also applicable to a case where they are associated with mail addresses or a telephone directory. In such a case, the URL obtaining means 15 obtains mail addresses or a telephone directory corresponding to the button specifying information. The HTTP generation means 17 generates an HTTP request or a phone number based on the obtained mail address or telephone directory. The transmission means 18 transmits the generated HTTP request to the mail server. When a desired number is taken out of the telephone directory, the transmission means 18 transmits the phone number over the telephone line to call the telephone on the other end. The obtaining means 19 obtains HTML or a response from the mail server or the telephone on the other end. The display instruction means 20 displays the obtained HTML or response on the display unit 3 by using the browser.

By virtue of having the above described structure, the present invention can obtain a desired mail address or phone number and display the relevant information in an automatic manner only by having its favorite-link button pressed while the facsimile machine is in an standby state. Further, by virtue of the fact that the name of the registered party on the other end corresponding to a mail address or phone number is displayed, it is made possible to send a communication while having the party on the other end confirmed. Further, since the information transmitted or received based on the mail address or phone number can be displayed, a desired display can be made by one-touch operation.

I claim:

1. A facsimile machine capable of accessing a server and displaying a home page, said facsimile machine comprising:

first button specifying information obtaining means for obtaining any of a plurality of button specifying information from a single entry entered while said facsimile machine is in a standby state;

address obtaining means for obtaining an address corresponding to selected one of the plurality of button specifying information;

protocol generation means for generating a protocol request based on the obtained address;

transmission means for transmitting the generated protocol request to the server;

data obtaining means for obtaining data from the server;

display instruction means for instructing the obtained data to be displayed; and a display unit for displaying the obtained data.

2. The facsimile machine according to claim 1, wherein the address obtained by said address obtaining means is a URL address, the protocol request generated by said protocol generation means is a HTTP request, and the obtained data obtained by said data obtaining means is in HTML format.

3. The facsimile machine according to claim 1, wherein the plurality of button specifying information obtainable by said first button specifying information obtaining means are each specified by one of a hardware button and a software button.

4. The facsimile machine according to claim 3, wherein each of the plurality of button specifying information is specified by one of the hardware buttons.

5. The facsimile machine according to claim 3, wherein each of the plurality of button specifying information is specified by one of the software buttons generated as an image on said display unit.

6. The facsimile machine according to claim 1, further comprising first determination means for confirming whether the address has been obtained.

7. The facsimile machine according to claim 1, further comprising second determination means for confirming whether a response has been obtained from the server.

8. The facsimile machine according to claim 1, wherein the address obtained by said address obtaining means is a mail address or a telephone directory corresponding to the one of plurality of the button specifying information, the protocol request generated by said protocol generation means is a HTTP request or a phone number based on the obtained mail address or the telephone directory, said transmission means transmits the generated HTTP request or the generated phone number to a mail server or a telephone, the obtained data obtained by said data obtaining means is data in HTML or a response from the mail server or the telephone, and said display instruction means displays the obtained data in HTML or the response on said display unit.

9. The facsimile machine according to claim 1, wherein said facsimile machine is capable of setting up the address corresponding to the selected one of the plurality of button specifying information, said facsimile machine further comprising;

mode selection means for selecting a set-up mode;

second button specifying information obtaining means for obtaining the selected one of the plurality of button specifying information entered upon selection of the set-up mode; and address set-up means for obtaining the address entered upon obtaining the selected one of the plurality of button specifying information and putting the address into storage in association with the button specifying information.

10. The facsimile machine according to claim 9, wherein when the set-up mode selected by said mode selection means is a URL set-up mode, the address set-up by said address set-up means is a URL address.

11. The facsimile machine according to claim 9, further comprising completion-of-set-up determination means for confirming completion of set-up of the address.

12. A program on a readable medium for being executed by a central processing unit of a facsimile machine capable of accessing a server and displaying a home page, said program comprising:

a program portion for obtaining any of a plurality of button specifying information from a single entry;

a program portion for obtaining a URL address corresponding to the obtained one of the plurality of button specifying information;

a program portion for determining whether the URL address has been obtained;

a program portion for generating a HTTP request based on the obtained URL address;

a program portion for allowing the generated HTTP request to be transmitted to the server having the URL address;

a program portion for obtaining data in HTML format from the server after receiving a piece of information of in response from the server;

a program portion for instructing the obtained data to be displayed on a display unit by using a browser function; and a program portion for instructing an error message to be displayed on the display unit when failing to obtain an URL address.

13. A method of utilizing a facsimile machine capable of displaying a home page by accessing a server, said method comprising:

obtaining any of a plurality of button specifying information from a single entry;

obtaining a URL address corresponding to the obtained one of the plurality of button specifying information;

determining whether the URL address has been obtained;

generating a HTTP request based on the obtained URL address;

allowing the generated HTTP request to be transmitted to the server having the URL address;

obtaining data in HTML format from the server after receiving a piece of information in response from the server;

instructing the obtained data to be displayed on a display unit by using a browser function; and instructing an error message to be displayed on the display unit when failing to obtain the URL address.

* * * * *